United States Patent Office 2,975,153
Patented Mar. 14, 1961

2,975,153

PROCESS FOR HEATING BUTYL RUBBER WITH METAL SALTS OF BENZOQUINONE IMINE OXIMES AND VULCANIZED PRODUCT THEREOF

Ching C. Tung, Kirkwood, Mo., and John J. D'Amico, Charleston, W. Va., assignors to Monsanto Chemical Company, St. Louis, Mo., a corporation of Delaware No Drawing. Filed Nov. 14, 1958, Ser. No. 773,808

11 Claims. (Cl. 260—41.5)

The present invention relates to a process of improving the properties of Butyl rubber by the method and means as disclosed. More particularly, the invention relates to improvements in the heat processing of Butyl rubber, to the vulcanizing of such treated Butyl rubber and to the vulcanized Butyl rubber so produced.

Butyl rubber is the well recognized generic name applied to a variety of elastic copolymers of isobutylene and small quantities of diolefins. The diolefins are usually chosen to give a final product which has only a small percentage of the unsaturation of natural rubber (not more than 15% diolefin). Due to this low unsaturation, Butyl rubber is very stable but for this same reason it is difficult to vulcanize. One of the deficiencies of Butyl rubber is poor hysteresis properties by which is meant slow recovery after distortion. The vulcanizates are logy and lack snap after elongation and release. These characteristics have limited the field of usefulness of Butyl rubber to a considerable extent.

An object of the present invention is to improve the properties of Butyl rubber vulcanizates by special treating agents. A particular object is to provide by these special treating agents a means to increase the modulus and otherwise improve the physical characteristics of the vulcanizate. A further object of the invention is to provide a process for simplifying and modifying the heat treatment of Butyl rubber as well as to lower the torsional hysteresis of the vulcanizates. A further object is to provide a special group of chemical compounds which improve the properties of Butyl rubber when heated with the rubber. Such improvers of heat treatment, as will be shown in the examples that follow, are metal salts of benzoquinone imine oximes.

More specifically, the preferred modifiers of Butyl rubber comprise metal salts of benzoquinone imine oximes of the general formula

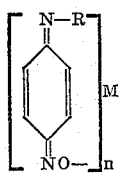

where R is alkyl, aryl, or carboalkoxy alkyl, M is a salt forming group and $n$ is the valence of M. Typical examples of R comprise methyl, ethyl, propyl, isopropyl, butyl, amyl, phenyl, methoxycarbonylethyl and ethoxycarbonylethyl. Examples of salt forming groups are the alkaline earth metals zinc, cadmium, copper, nickel and the like.

According to this invention, a mix is first prepared designated as "modified Butyl rubber." This is accomplished most readily by mixing the raw Butyl rubber with from 0.3 to 1.0% by weight of the metal salt in a Banbury mill for about 10 minutes while maintaining the mix at a temperature of substantially 257° F. Thereupon carbon black is added in the normal manner and mixing continued for 5 minutes at about 302° F. The carbon black-modified Butyl rubber master batch is then dumped from the Banbury mill and compounding of the completed mix continued in normal manner on the differential rubber mills with no further heat treatment. In all cases in the results set forth below, the same recipe or formula was followed and comprised the following:

| | Parts by weight |
|---|---|
| Butyl rubber | 100.0 |
| Modifier as shown | 0.5 |
| Carbon black | 50.0 |
| Zinc oxide | 7.5 |
| Tetramethyl thiuram disulfide | 1.0 |
| 2,2'-dithiobis benzothiazole | 1.0 |
| Sulfur | 2.0 |

Vulcanization was carried out by heating in a press for 45 minutes at a temperature of 307° F. Physical properties including modulus of elasticity at 300% elongation, tensile strength at break and percent elongation at break were all determined in the well known manner. The results obtained from the various examples of the invention are as follows:

*Table I*

| Modifier | Modulus at 300% Elong. | Tensile at Break in lbs./in.² | Ult. Elong., Percent | Torsional Hysteresis |
|---|---|---|---|---|
| None | 1,580 | 3,690 | 500 | 0.407 |
| Cadmium salt of N-phenyl benzoquinone imine oxime dihydrate | 1,600 | 3,000 | 500 | 0.305 |
| Zinc salt of N-phenyl benzoquinone imine oxime | 1,820 | 2,870 | 470 | 0.311 |
| Cadmium salt of N-(2-methoxycarbonyl ethyl)-benzoquinone imine oxime tetrahydrate | 2,020 | 3,060 | 450 | 0.281 |
| Zinc salt of N-(2-methoxycarbonyl ethyl)-benzoquinone imine oxime | 2,520 | 3,140 | 360 | 0.172 |
| Nickel salt of N-phenyl benzoquinone imine oxime tetrahydrate | 1,730 | 2,920 | 490 | 0.278 |
| Copper salt of N-phenyl benzoquinone imine oxime | 2,000 | 2,920 | 440 | 0.273 |
| Copper salt of N-(2-methoxycarbonyl ethyl)-benzoquinone imine oxime tetrahydrate | 2,650 | 3,180 | 390 | 0.172 |
| Zinc salt of N-methyl p-benzoquinone imine oxime | 2,350 | 3,040 | 420 | 0.192 |
| Nickel salt of N-methyl p-benzoquinone imine oxime hydrate | 1,980 | 3,070 | 480 | 0.218 |
| Copper salt of N-methyl p-benzoquinone imine oxime | 1,800 | 2,700 | 470 | 0.292 |
| Cadmium salt of N-methyl p-benzoquinone imine oxime | 1,610 | 2,720 | 500 | 0.271 |

The results show that by employing the class of compounds described in the manner set forth, Butyl rubber is modified in character so to produce in a fully compounded stock after vulcanization different properties from those required for an inner tube compound. These properties increase the field of application for Butyl rubber.

While 0.5 part based on 100 parts of Butyl rubber is about optimum, the modifier concentration can vary. As low as 0.3 part exerts noticeable activity. Amounts higher than 0.5 part also modify Butyl rubber but are not necessarily more advantageous. Further tests were carried out which illustrate the effect of concentration. Raw Butyl rubber was mixed with the modifier in a Banbury mill at 300° F. for ten minutes, carbon black added and the mixing continued for another ten minutes, and then curatives added on a mill as described above.

Physical properties of the vulcanizates obtained by heating in a press for 45 minutes at 291° F. were as follows:

Table II

| Modifier and Percent Concentration Based on Butyl | Modulus at 300% Elong. | Tensile at Break in lbs./in.² | Ult. Elong. Percent | Torsional Hysteresis |
| --- | --- | --- | --- | --- |
| None | 1,310 | 2,790 | 610 | 0.478 |
| Nickel salt of N-isopropyl p-benzoquinone imine oxime—0.963% | 2,090 | 2,600 | 400 | 0.198 |

The addition of fillers such as carbon black before the heat treatment decreases the resilience of the compounded stock. In other words, addition of carbon black prior to heat treatment detracts from the advantages of the chemical modifier.

The new adjuvants may be conveniently prepared by dissolving the corresponding nitrosoaniline in aqueous sodium hydroxide and adding a metal salt containing a cation which forms a water insoluble salt of the benzoquinone imine oxime. However, other methods of preparation are suitable and even preferable in some instances. The preparation is illustrated by the following typical procedures:

To a solution of 10.7 grams (0.067 mole) of 25% sodium hydroxide in 200 ml. of water was added 11 grams (0.067 mole) of N-isopropyl-p-nitrosoaniline. After the amine was all dissolved, 19.6 grams (0.067 mole—100% excess) of $Ni(NO_3)_3 \cdot 6H_2O$ was added. The brown precipitate which formed was filtered, washed with water and air dried. The nickel salt of N-isopropyl-p-benzoquinone imine oxime so obtained was a blue solid melting above 300° C. The yield was 65% of theory.

To a stirred solution of 39.7 grams (0.2 mole) of p-nitroso diphenylamine and 32 grams (0.2 mole) of 25% sodium hydroxide in 1000 ml. of water was added in one portion 13.6 grams (0.1 mole) of zinc chloride dissolved in 500 ml. of water. The mixture was stirred for one hour, filtered, washed with water until neutral to litmus and air dried at room temperature. The zinc salt of N-phenyl-p-benzoquinone imine oxime was obtained in 98% yield as a brown solid. It melted at 143–146° C. with decomposition.

In the foregoing example, 41.7 grams (0.2 mole) of methyl N-(p-nitrosophenyl) β-alaninate was substituted for the p-nitroso diphenylamine. The zinc salt of N-(2-methoxycarbonyl ethyl) benzoquinone imine oxime was obtained in 71% yield as a green solid, M.P. 107–112° C. with decomposition.

The physical properties of other examples are set forth below:

Cadmium salt of N-phenyl benzoquinone imine oxime dihydrate, brown solid, M.P. 141–146° C.*

Cadmium salt of N-(2-methoxycarbonyl ethyl) p-benzoquinone imine oxime tetrahydrate, brown-green solid, M.P. 145–150° C.*

Nickel salt of N-phenyl benzoquinone imine oxime tetrahydrate, brown solid, M.P. 145–150° C.*

Copper salt of N-phenyl p-benzoquinone imine oxime, brown solid, M.P. 141–145° C.*

Copper salt of N-(2-methoxycarbonyl ethyl) p-benzoquinone imine oxime tetrahydrate, brown solid, M.P. 105–113° C.*

Zinc salt of N-methyl-p-benzoquinone imine oxime, green solid, M.P. above 300° C.

Nickel salt of N-methyl-p-benzoquinone imine oxime hydrate, green solid, M.P. above 300° C.

Copper salt of N-methyl-p-benzoquinone imine oxime, green solid, M.P. above 300° C.

Cadmium salt of N-methyl-p-benzoquinone imine oxime, blue solid, M.P. above 300° C.

---

* With decomposition.

It is intended to cover all changes and modifications of the examples of the invention herein chosen for purposes of disclosure which do not constitute departures from the spirit and scope of the invention.

What is claimed is:

1. The process which comprises heating a raw rubbery copolymer of at least 85% isobutylene and a minor amount of a conjugated diene hydrocarbon and 0.3 to 1.0% of a metal salt of a benzoquinone imine oxime of general formula

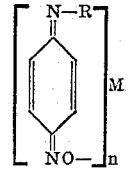

where R is selected from the group consisting of alkyl, phenyl and carboalkoxy alkyl, M is a salt forming group and n is the valence of M, the combination of temperature and time being substantially as severe as a combination of a temperature of 275° F. for a time of ten minutes whereby the torsional hysteresis of a vulcanizate obtained therefrom is lower than the torsional hysteresis of a vulcanizate prepared in identical manner from the same rubber and compounding and curing ingredients except that the aforesaid metal salt of the benzoquinone imine oxime is omitted.

2. The process which comprises heating a raw rubbery copolymer of at least 85% isobutylene and a minor amount of a conjugated diene hydrocarbon and 0.3 to 1.0% of a metal salt of a benzoquinone imine oxime of the general formula

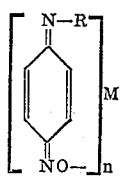

where R is an alkyl radical and M is an alkaline earth metal and n is the valence of M, the combination of temperature and time being substantially as severe as a combination of a temperature of 275° F. for a time of ten minutes whereby the torsional hysteresis of a vulcanizate obtained therefrom is lower than the torsional hysteresis of a vulcanizate prepared in identical manner from the same rubber and compounding and curing ingredients except that the aforesaid metal salt of the benzoquinone imine oxime is omitted.

3. The process which comprises heating a raw rubbery copolymer of at least 85% isobutylene and a minor amount of a conjugated diene hydrocarbon and 0.3 to 1.0% of a metal salt of a benzoquinone imine oxime of the general formula

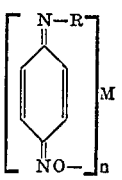

where R is a carboalkoxy alkyl radical. M is an alkaline earth metal and n is the valence of M, the combination of temperature and time being substantially as severe as a combination of a temperature of 275° F. for a time of ten minutes whereby the torsional hysteresis of a vulcanizate obtained therefrom is lower than the torsional hysteresis of a vulcanizate prepared in identical manner from the same rubber and compounding and curing ingredients except that the aforesaid metal salt of the benzoquinone imine oxime is omitted.

4. The process which comprises heating at about 300° F. for about ten minutes a mixture consisting of a raw rubbery copolymer of at least 85% isobutylene and a minor amount of a conjugated diene hydrocarbon and 0.3 to 1.0% of the nickel salt of N-isopropyl benzoquinone imine oxime, whereby the torsional hysteresis of a vulcanizate obtained therefrom is lower than the torsional hysteresis of a vulcanizate prepared in identical manner from the same rubber and compounding and curing ingredients except that the aforesaid nickel salt of N-isopropyl benzoquinone imine oxime is omitted.

5. The process which comprises heating at about 300° F. for about ten minutes a mixture consisting of a raw rubbery copolymer of at least 85% isobutylene and a minor amount of a conjugated diene hydrocarbon and 0.3 to 1.0% of the zinc salt of N-methyl-p-benzoquinone imine oxime, whereby the torsional hysteresis of a vulcanizate obtained therefrom is lower than the torsional hysteresis of a vulcanizate prepared in identical manner from the same rubber and compounding and curing ingredients except that the aforesaid zinc salt of N-methyl-p-benzoquinone imine oxime is omitted.

6. The process which comprises heating at about 300° F. for about ten minutes a mixture consisting of a raw rubbery copolymer of at least 85% isobutylene and a minor amount of a conjugated diene hydrocarbon and 0.3 to 1.0% of the zinc salt of N-(2-methoxycarbonyl ethyl) benzoquinone imine oxime, whereby the torsional hysteresis of a vulcanizate obtained therefrom is lower than the torsional hysteresis of a vulcanizate prepared in identical manner from the same rubber and compounding and curing ingredients except that the aforesaid zinc salt of N-(2-methoxycarbonyl ethyl) benzoquinone imine oxime is omitted.

7. The process which comprises heating at about 300° F. for about ten minutes a mixture consisting of a raw rubbery copolymer of at least 85% isobutylene and a minor amount of a conjugated diene hydrocarbon and 0.3 to 1.0% of the copper salt of N-(2-methoxycarbonyl ethyl) p-benzoquinone imine oxime tetrahydrate, whereby the torsional hysteresis of a vulcanizate obtained therefrom is lower than the torsional hysteresis of a vulcanizate prepared in identical manner from the same rubber and compounding and curing ingredients except that the aforesaid copper salt of N-(2-methoxycarbonyl ethyl) p-benzoquinone imine oxime tetrahydrate is omitted.

8. The process of claim 1 followed by the addition of carbon black, zinc oxide, accelerator and sulfur and vulcanizing.

9. The process of claim 1 followed by the addition of carbon black, zinc oxide, thiuram disulfide accelerator and sulfur and vulcanizing.

10. The composition prepared by the process of claim 1.

11. A vulcanized composition obtained by vulcanizing the composition prepared by the process of claim 1.

References Cited in the file of this patent

UNITED STATES PATENTS 2,822,342    Ford _____ Feb. 4, 1958